United States Patent [19]
Wu

[11] Patent Number: 6,075,758
[45] Date of Patent: Jun. 13, 2000

[54] SELECTOR MECHANISM FOR MULTIPLE COMPACT DISKS AND METHOD OF SELECTION

[76] Inventor: Qian Wu, 1875 Pointe Crossing, #101, Ann Arbor, Mich. 48105

[21] Appl. No.: 08/170,020

[22] Filed: Dec. 20, 1993

[51] Int. Cl.[7] .............................. G11B 17/22; G11B 17/04
[52] U.S. Cl. ............................................. 369/36; 369/191
[58] Field of Search ..................................... 369/191, 192, 369/178, 34, 36, 38; 360/92

[56] References Cited

U.S. PATENT DOCUMENTS

| | | |
|---|---|---|
| 1,399,110 | 12/1921 | Godfrey . |
| 1,508,572 | 9/1924 | Ord . |
| 3,097,850 | 7/1963 | Curci . |
| 3,444,334 | 5/1969 | Clark . |
| 3,976,301 | 8/1976 | Corbett et al. .............................. 274/10 |
| 4,566,087 | 1/1986 | Kraft .......................................... 369/34 |
| 4,670,866 | 6/1987 | Hasegawa et al. ......................... 369/36 |
| 4,755,978 | 7/1988 | Takisawa ................................... 369/37 |
| 4,827,463 | 5/1989 | Motoyoski et al. ....................... 369/36 |
| 5,020,043 | 5/1991 | Kohler ....................................... 369/36 |
| 5,033,038 | 7/1991 | Kobayashi et al. ....................... 369/36 |
| 5,319,621 | 6/1994 | Amar ......................................... 369/36 |
| 5,335,218 | 8/1994 | Oscada ...................................... 369/36 |

*Primary Examiner*—Allen T. Cao
*Attorney, Agent, or Firm*—Brooks & Kushman P.C.

[57] ABSTRACT

A selector mechanism having a plurality of parallel spaced vertically aligned compact disk holders is disclosed. Each holder has storage positions for a number of compact disks. A pair of compact disk player assemblies which can alternatively access each storage position are movably aligned with the holders. By alternatively moving the assemblies from rest positions beyond the stack of holders to positions corresponding to selected holders the assemblies can continuously pick up and play selected compact disks without pauses between selections. A method of using the mechanism is also disclosed.

4 Claims, 6 Drawing Sheets

SELECTOR MECHANISM FOR MULTIPLE COMPACT DISKS AND METHOD OF SELECTION

TECHNICAL FIELD

The present invention relates to a device and method for selectively playing a large number of musical selections normally referred to as a jukebox or for selectively accessing a large amount of data stored on compact disks. More particularly, the invention relates to a mechanism for selecting and storing the compact disks.

BACKGROUND ART

Jukeboxes have long been used for the playing of phonographic records. With the development and substitution of compact disks for phonographic records in the music industry, there has developed a need for jukeboxes capable of effectively playing and storing compact disks.

Further, traditional jukeboxes normally require a pause between the ending of one selection and the beginning of the next due to the use of devices that select a single record at a time and have only one playing station. This results in dead time between selections which is disappointing to the listener. Jukeboxes are normally used as a revenue generator for an establishment. The dead time between selections decreases potential revenue for the establishment.

Since compact disks also are now used for data storage, there are situations where large numbers of compact disks need to be efficiently accessible so they can be read by a computer. Again, any dead time between selections of such compact disks interferes with the information flow to the computer which decreases the efficiency of the system.

An object of the present invention is to provide a simple but effective device for selecting and playing CDs in jukeboxes or in connection with data processing systems while providing access to a large number of compact disks.

Another object of the present invention is to prevent the loss of time between musical or data selection.

DISCLOSURE OF THE INVENTION

The selector mechanism is provided for multiple compact disks includes a housing with a plurality of spaced apart substantially parallel compact disk holders stacked vertically in the housing. Each holder is capable of supporting a plurality of compact disks in individual storage positions and has a cut-out portion. A compact disk player assembly can move vertically within the housing includes a CD player. The assembly also has an extended portion shaped to pass through the cut-out portion of the holders. Means are provided for selectively moving the assembly vertically between operating positions corresponding to each of the holders. When the extended portion of the assembly is aligned with the cut-out portion of the holders, the extended portion can pass through the cut-out portion. Means are also provided for moving the holder which corresponds to the assembly when the assembly is in its operating position. These means move the holder relative to the assembly between a cache position where the cut-out portion is aligned with the extended portion of the assembly and a selection portion where the extended portion of the assembly overlies a compact disk storage position of the holder. In the storage position, the assembly can pick up a compact disk supported on the holder at that storage position and load the compact disk within the player.

The embodiment preferably includes a second compact disk player assembly moveable and operable similar to the first. Each assembly alternatively can move to rest positions not conflicting with the operating position of the other assembly.

A method for selecting and playing the multiple first and second compact disks to be played. A first compact disk player assembly including a first compact disk player is moved vertically through a cut-off portion of a vertical stack of compact disk holders on each of which is stored the plurally of compact disks. The first assembly is stopped at a level corresponding to the holder on which the first selected compact disk is stored. The holder is then rotated until the storage position of the selected compact disk is positioned within the first player assembly at which point it is loaded into the first CD player. The holder is then rotated back to its initial position and the assembly moved through the stack of holders to a first rest position. A second compact disk player assembly with a second CD player is moved through the cut-out portion of the vertical stack and is stopped at a level corresponding to the holder in which the second selected CD is stored. This holder is then rotated until the storage position of the second selected compact disk is positioned within the second assembly. The CD is then loaded into the second CD player. The holder is returned to the initial position and the assembly is moved to a second rest position.

BEST MODE FOR CARRYING OUT THE INVENTION

Figures 1, 2:
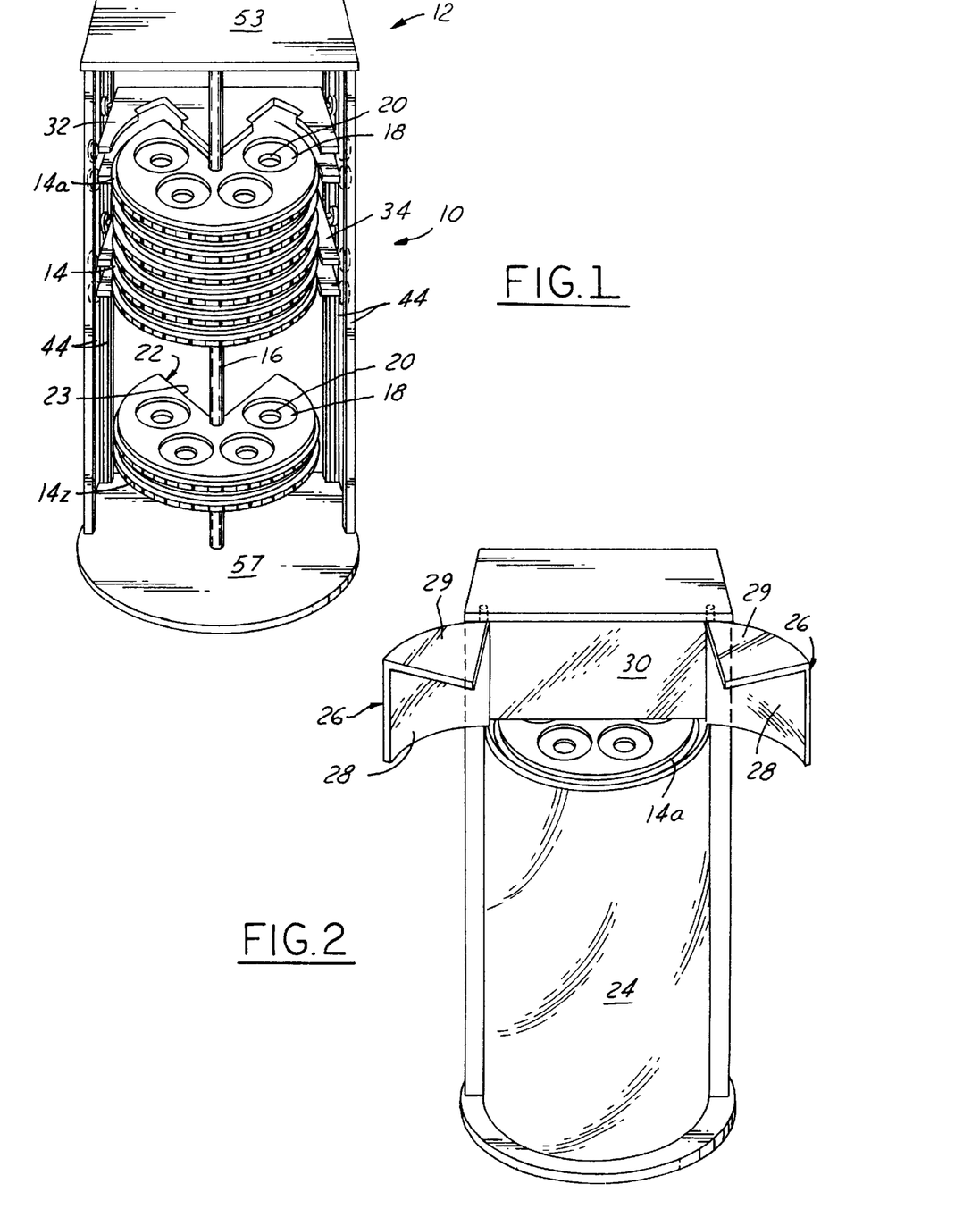
FIG. 1 is a front perspective view of a selector mechanism for multiple contact disks with the front cover and certain elements removed for clarity.
FIG. 2 is a front perspective view of the selector mechanism with the front cover in place but open.

As shown in FIG. 1 of the drawings, a jukebox generally indicated by 10 has a housing 12. Within the housing are a stack of plurality of parallel spaced vertically aligned compact disk holders 14. The number and size of holders will vary based upon the number of compact disks (CDs) which are desired to be stored. The holders are rotatably joined to a central axis 16. A number of the holders are omitted from FIG. 1 so to better show the interior of the housing but would extend in an evenly spaced manner from the top holder 14a to the bottom 14z. The holders are substantially planar but have positioned on their upper surface compact disk receiving depressions 18 corresponding to storage positions for compact disks. Each compact disk receiving depression is a centrally located hole 20 extending entirely through the holder for purposes to be described later. The number of CDs which one wishes to store determines the number and the size of the holders to allow a greater or lesser number of CDs to be placed upon the holder. In the preferred embodiment, four CDs can be placed on a given holder for storage. Each holder also has a pie-shaped opening or cutout portion 22 extending outward from the central axis 16 with interior edge 23.

FIG. 2 shows an outer covering 24 for the front open face of the housing. This covering is preferably transparent since experience has shown people enjoy watching the operation of jukeboxes. The covering extends from the bottom of the housing over most of the front opening in the housing to approximately the level of the top holder 14a in the preferred embodiment so to provide a semi arcuate surface. A pair of doors 26 are pivotably attached to the housing and extend above the covering. Each door includes a section 28 which will form a continuation of the arcuate covering when closed. The doors each include a top wedge section 29 so that when closed they form a semicircular top which completes the enclosure of the front of the housing. Behind the doors there is an interior wall 30 which extends straight across the front of the housing to provide limited access to a portion of holder 14a which includes at least one storage position.

Within the housing are positioned a pair of compact disk player assemblies 32 and 34. Each player assembly includes an upper and lower plate 36, 38 between which is placed a CD player 40 with a loading mechanism 41. Positioned on the outer four corners of each plate are wheels 42 which ride within four guide rails 44 vertically aligned on the interior of each side of the housing. Thus, there are a total of eight wheels 44 for each assembly. Guide rails allow each of the CD player assemblies to be moved vertically, i.e., perpendicular to the holders. The plates are kept horizontal by the interaction of the wheels and the guide rails.

Figure 3:
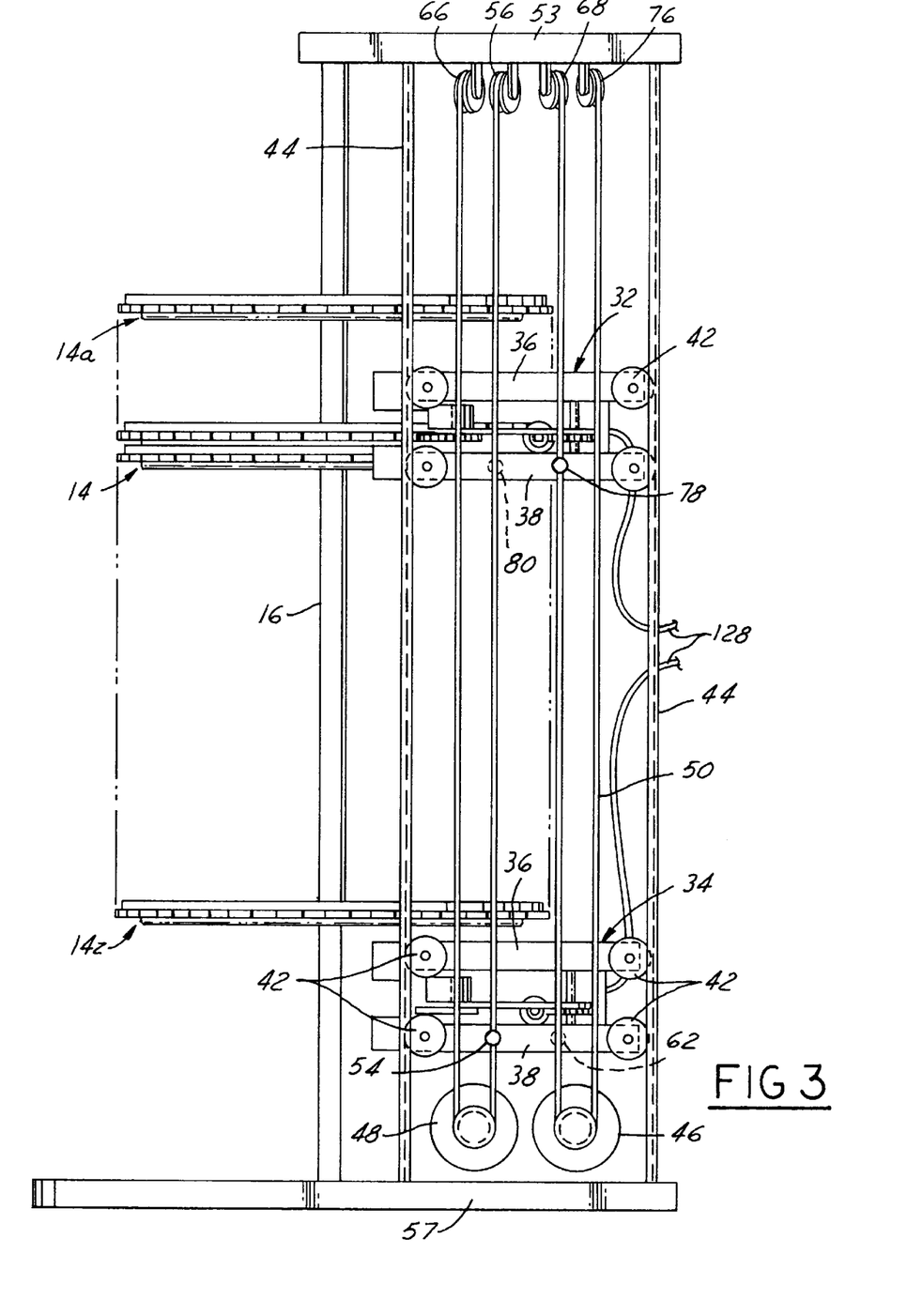
FIG. 3 is a side view of the selector mechanism.
Figures 4, 5:
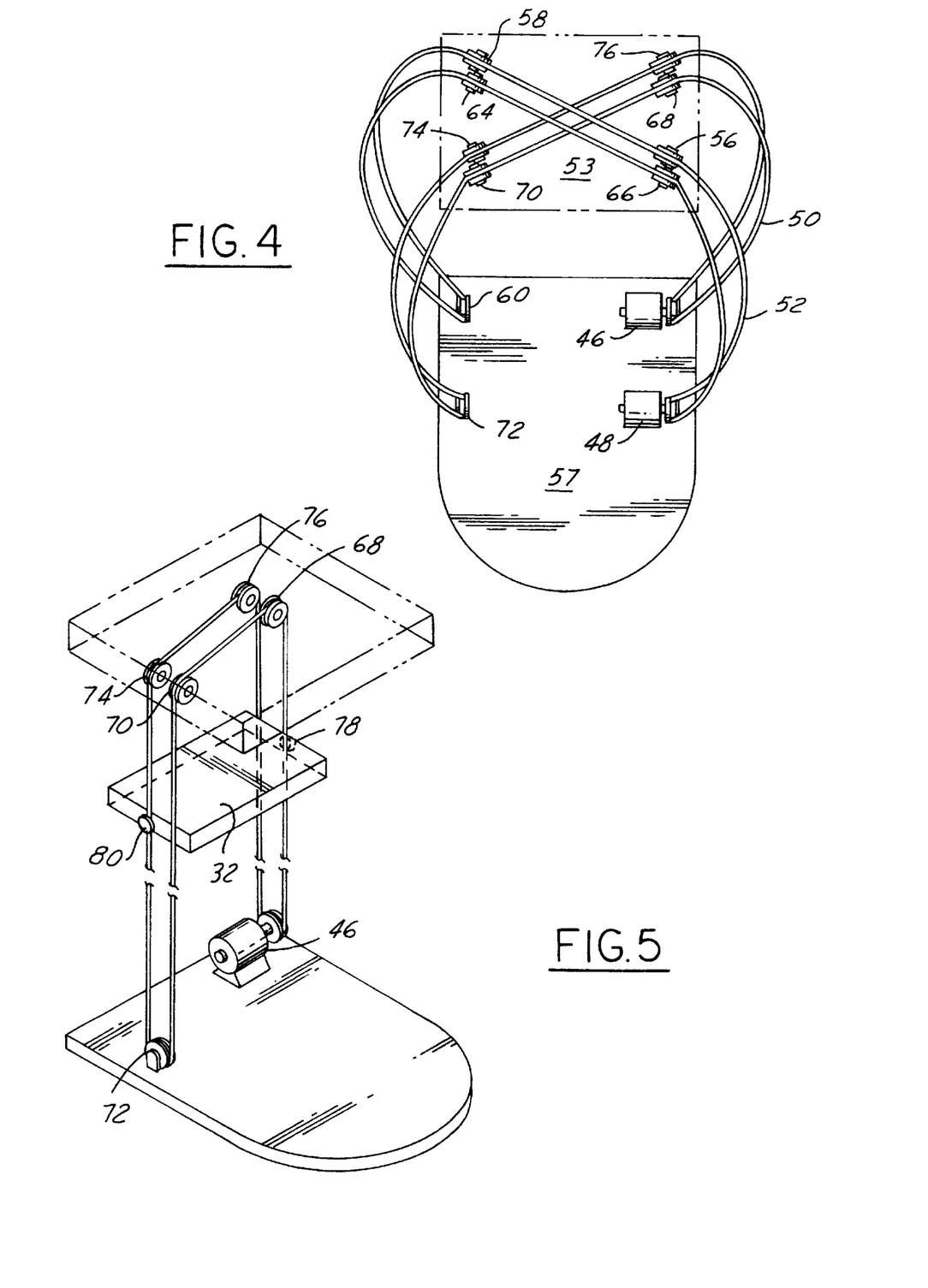
FIG. 4 is a top view of the cable arrangements between the bottom and top (displaced in phantom outline) of the housing of the selector mechanism.
FIG. 5 is a perspective view showing one of the cables and its relationship to a compact disk player assembly of the selector mechanism.

Means are provided for moving each CD player assembly independently of the other assembly as best shown in FIGS. 3–5. Each CD player assembly 32,34 has assigned to it a motor 46, 48. The motor reversibly drives endless cable 50, 52. Cable 52 extends upward from the motor 48 and is fixedly attached at 54 to the CD player assembly 34. The cable continues upwardly through pulley 56 which is attached to the top 53 of the housing. The cable then extends across the top housing to a second pulley 58, which is also attached to the top of the assembly. From the second pulley, the cable extends downward past the CD player assembly to a third pulley 60 joined to the bottom 57 of the housing. The cable continues back up from pulley 60 and again is attached fixedly to the CD player assembly at 62 and through it to a fourth pulley 64 attached to the top of the housing. From that pulley 64, it goes across the top of the housing to pulley 66 and down past the CD player assembly to the motor. Endless cable 50 similarly is joined to motor 46 in a corresponding series of pulleys 68, 70, 72, 74 and 76. It is attached to the second CD player assembly 32 at attachment point 78 and 80. Thus, by selectively activating motors 46 and 48, CD player assembly 32 and 34 can be moved upward or downward within guide rails 44.

Upper and lower plates of each CD player assembly have a portion 82 which faces toward the axis upon which the holders are positioned that is substantially pie-shaped or triangularly shaped, as best shown in FIG. 1. This triangular-shaped portion 82 extends into the circular area defined by outer edge of the holders as they are rotated around the central axis. To allow passage of the CD player assembly past the holder, each holder has a pie-shaped portion 22 removed corresponding to the pie-shaped portion 82 of the CD player assemblies. The CD player assemblies may also have cutback portions 84 to allow for the CD player assemblies to pass by the outside edge or periphery 85 of the holders 14 and latches 113.

Figure 6:
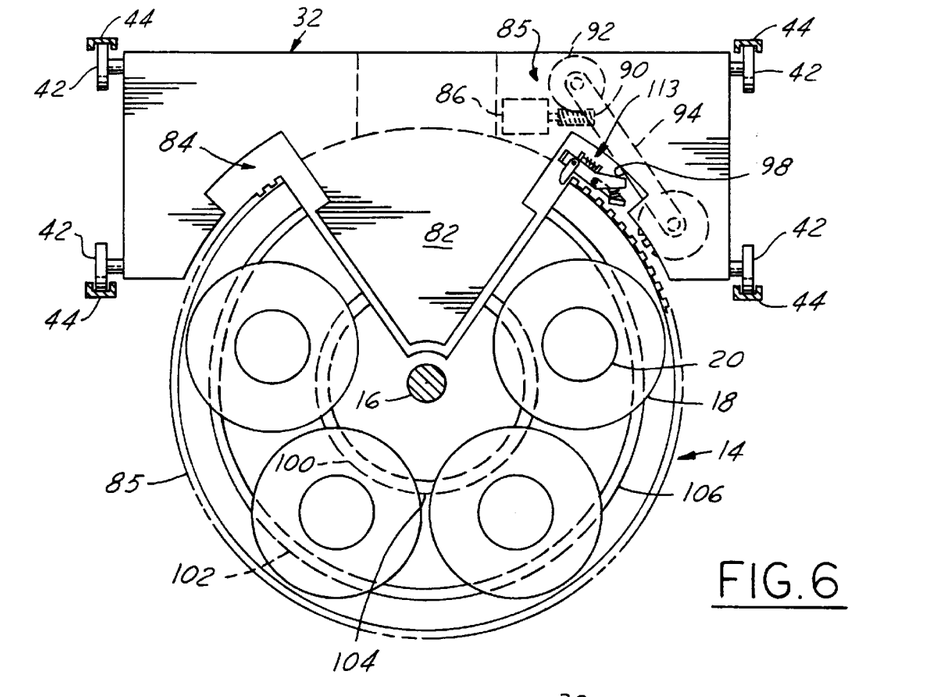
FIG. 6 is a top view showing a compact disk player assembly and an associated disk holder.
Figure 7:
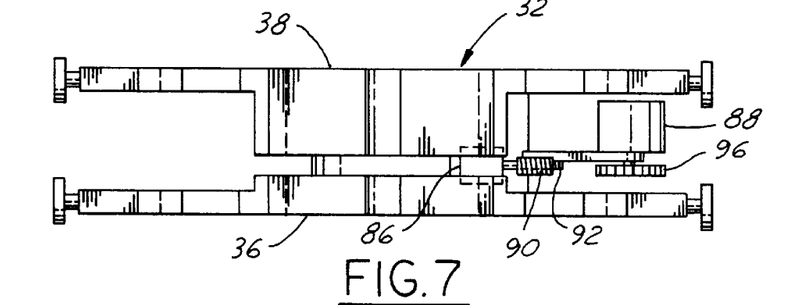
FIG. 7 is a front view of the player assembly.

The spacing between upper and lower plate of the CD player assembly allow each holder when rotated to pass between the two plates when the CD holder is in an operative position at the level of that holder. When the CD player assembly is positioned at the level of a holder, rotation of the holder is accomplished by means of driving assemblies 85 which each include a pair of motors 86, 88 carried by each assembly best shown in FIGS. 6 and 7. Since each driving assembly is the mirror image of the other only one is shown. Motor 86 controls worm gear 90 which interacts with gear 92. Gear 92 is pivotably mounted to upper and lower plate of the CD player assembly. Fixedly joined to gear 92 is one end of arm 94. Through the other end of arm 94 is positioned motor 88 and a corresponding gear 96. The teeth of gear 96 are designed to mate with teeth on the outer periphery 85 of each housing. Pin 98 is on the side of arm 94 facing the holders.

Figure 8:
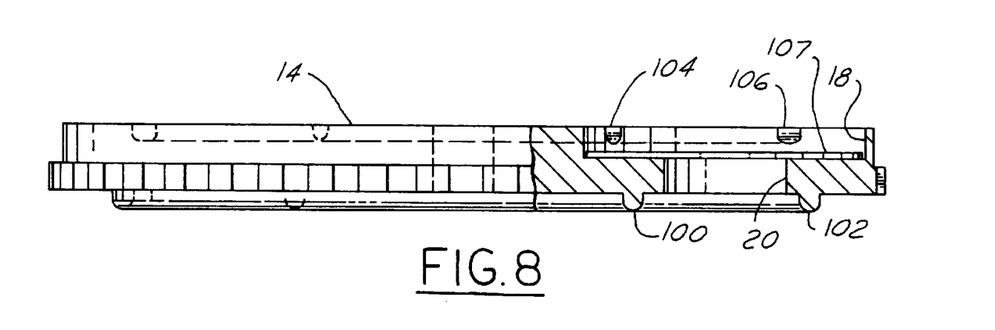
FIG. 8 is a side view partially cut away of a compact disk holder of the selector mechanism.

Provided on each holder a pair of ridges 100 and 102 and corresponding grooves 104 and 106 which aid in maintaining the compact disk within the holder's compact disk receiving depressions 18. The compact disk receiving depressions are sufficiently deep so that when a CD 107 is placed within the depression there will remain a slight distance between the upper surface of the compact disk and the upper surface of the holder as best shown in FIG. 8. The holders are spaced from one another such manner that ridges 100 and 102 extend below the level of upper surface of the holder yet providing some clearance between the lower surface of the ridge and upper surface of any compact disk placed within the depression. Such an arrangement with compact disks stored within the depression would be restrained from movement out of the depression even during movement of the entire jukebox or if the jukebox was accidently upturned. To allow for rotation arcuate grooves 104 and 106 extend between the depressions 18 and the cut out portion to allow for passage of the ridges during rotation of the holder.

The loading mechanism 41 of the compact disk player assembly is best shown in FIGS. 14–17. Attached to the triangular shaped portion of the lower plate is a lifter mechanism 108. The lifter includes pad 109 which can be raised or lowered. When a holder is rotated so that the it takes a selection position the CD 107 lies between the upper and lower plates of the CD player assembly the lifter mechanism pad may be elevated through hole 20 where it contacts and lifts the CD until it is at a level above the upper surface of the holder and in contact with the player mechanism 110 of the CD player 40. The CD is held at this level by capturing means 111 in the form of 3 or 4 hooks 112 pivotably joined to the upper plate. The lifter pad 110 is then lowered through the hole to the level beneath the holder until the holder is rotated back to its normal storage position. The lifter pad is then raised again until it touches the CD and acts as a press for the player mechanism 110. At that point, the CD can be played.

In the preferred embodiment, the pie-shaped cutaway portion is equal to approximately 120° arc. To restrain holders from rotating, a pair of latches 113 are provided for each holder. Since the latches for each holder are mirror images of each other, only one is shown. The latches are best shown in FIGS. 9–13. Each latch is connected to a vertically extending bar 114 which extends from the top to the bottom of the housing. Extending from the bar at a level corresponding with each holder area pair of platforms 116. Since the platform and latch bodies are lined vertically to correspond with the holders, each platform can serve two holders by being pivotally joined to one latch body above and one latch body below the platform. Each pair of platforms is pivotally joined at 118 to latch body 120. FIG. 12 shows platforms corresponding to three holders.

Figure 9:
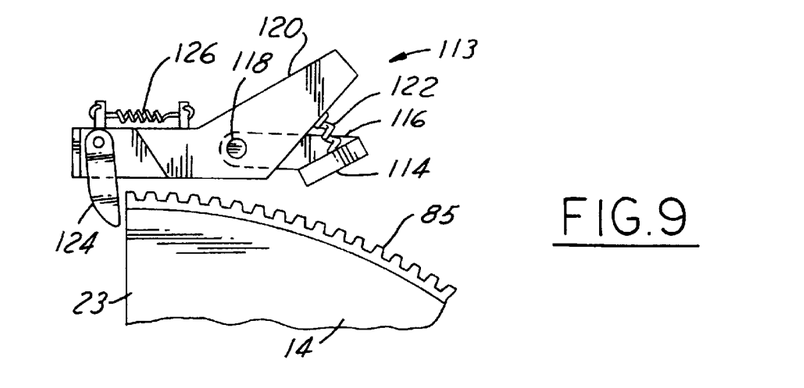
FIG. 9 is a partial top view of a compact disk holder and a latch of the selector mechanism in its restraining position.
Figures 10, 11, 12, 13:
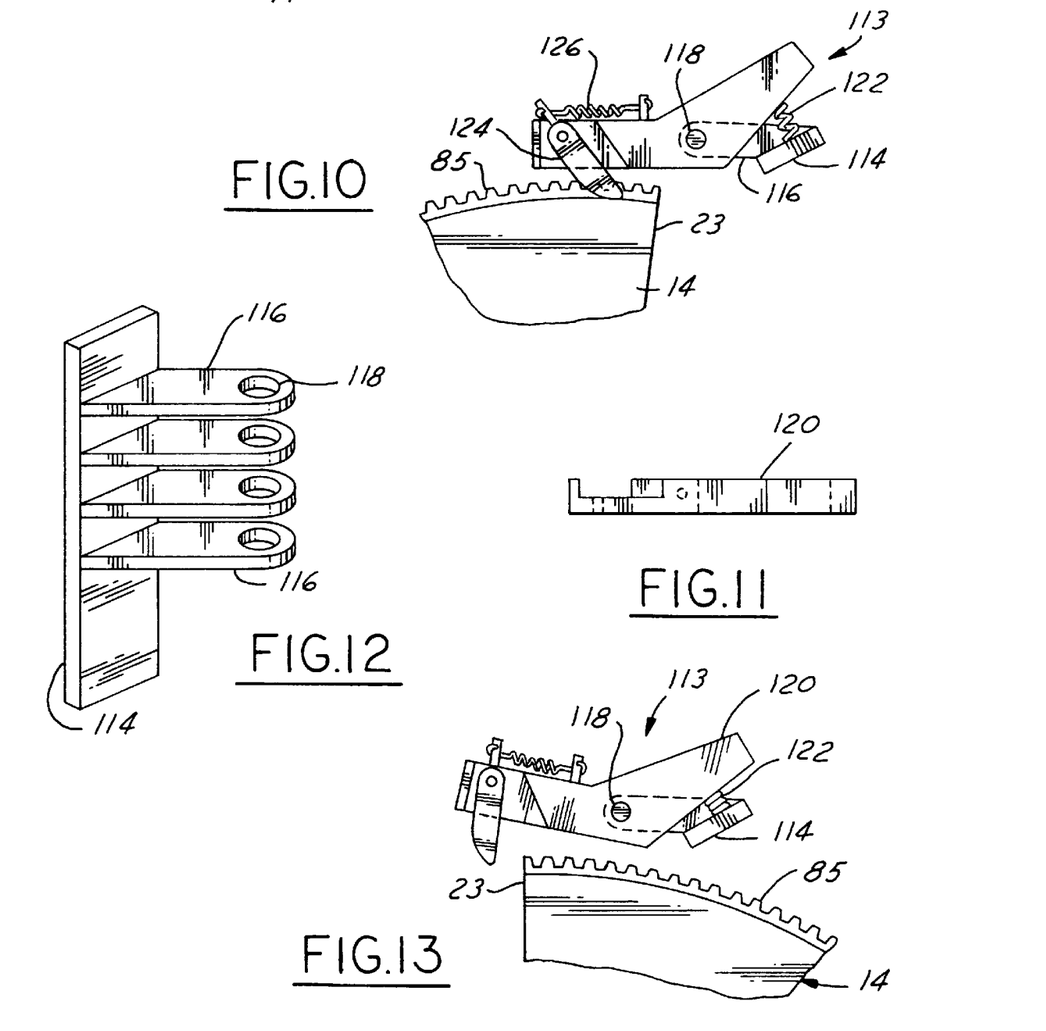
FIG. 10 is a partial top view of a compact disk holder and a latch of the selector mechanism in its bypass position.
FIG. 11 is a bottom view of a latch body of the selector mechanism.
FIG. 12 is a perspective view of a latch bar.
FIG. 13 is a partial top view of a compact disk holder and a latch of the selector mechanism in its retracted position.
Figure 14:
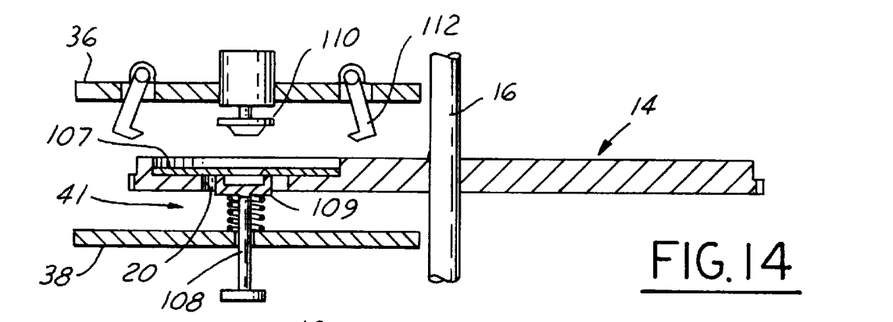
FIG. 14 is a partial side view of a compact disk player assembly and an associated holder in its selection position prior to the compact disk being removed from the holder.
Figure 15:
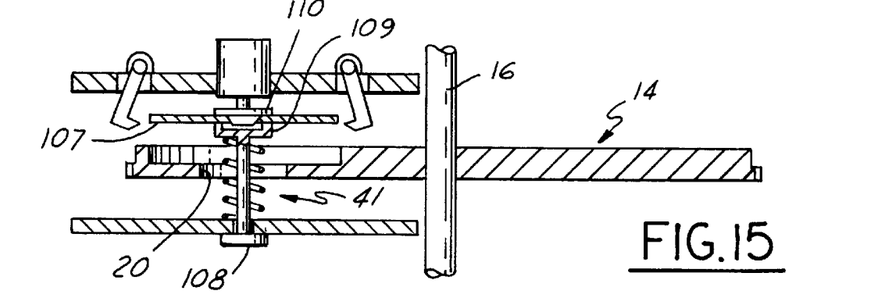
FIG. 15 is a partial side view of a compact disk player assembly and an associated holder in its selection position when the compact disk has been removed from the holder.
Figure 16:
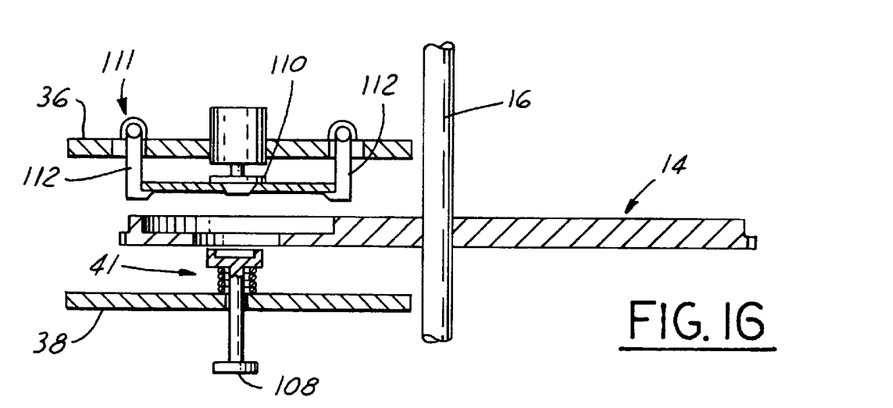
FIG. 16 is a partial side view of a compact disk player assembly and an associated holder in its selection position while the compact disk is being held for rotation of the holder.
Figure 17:
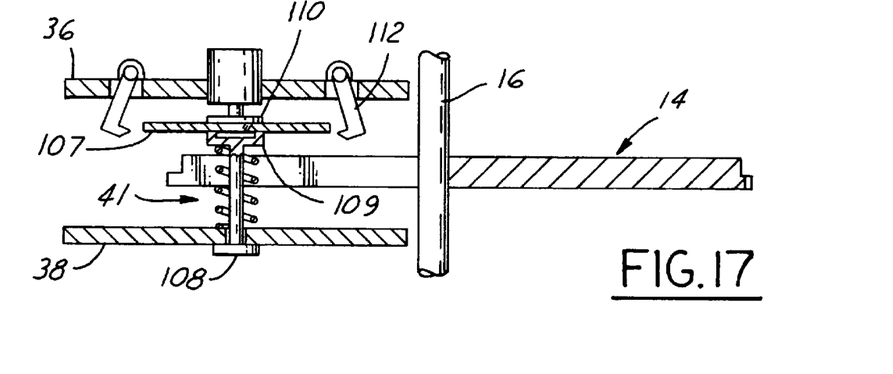
FIG. 17 is a partial side view of a compact disk player assembly and an associated holder in its cache position the compact disk is in position to be played.

As shown in FIG. 9, the latch body 120 is normally urged away from bar 114 in a counterclockwise direction by spring 122. On the other side of pivot 118 is latch arm 124 which is in turn pivotally connected to body 120. The latch arm is normally held in a substantially perpendicular relationship to the latch body by spring 126. Thus, in its restraining position arm 124 will normally extend into the path of rotation of its corresponding holder 14 and abut the interior edge 23 of th e cut-out area 22. Since arm 124 is constrained in the amount of rotation it may make in the clockwise direction by the outer edge of body 120, it will resist and restrain rotation of holder 14 in a counterclockwise direction as shown in FIG. 9. The other mirror image latch for holder 14 will normally resist rotation in a clockwise direction. Thus, holder 14 will normally be maintained in a prescribed condition corresponding to its cache position by the latches. The holders cache positions are aligned so to allow the extended portion of the compact disk player assemblies to move vertically past the holders through the cut-out portions of the holders.

When it is desired to move a holder from its storage position, the CD player assembly is positioned on a level corresponding to the holder. If one wishes to move the holder in a counterclockwise direction, the motor 86 on the right hand side of the assembly is energized so to turn worm gear 90. Worm gear will cause gear 92 to move in a clockwise direction and arm 94 will, therefore, move toward holder 14. As arm 94 moves gear 96 towards the outer periphery of holder 14, a pin 98 on an arm 94 contacts the rear portion of body 120 so to cause it to pivot in a clockwise direction towards bar 100 thereby moving arm 108 out of the path of the holder. By the time gear 96 contacts the outer periphery of holder 14, latch arm 124 is moved sufficiently out of the path of the holder in a retracted position as shown in FIG. 13 to allow motor 88 when energized to rotate holder 14 in a counterclockwise direction about central axis 16. The ridges 100, 102 on the lower surface enter into the grooves 104, 106 on the upper surface of the lower plate of the assembly. This will cause the holder and the player assembly to maintain a fixed radial relationship during holder rotation. Should rotation of holder 14 continue until it contacts the second latch, the second latch will allow passage by pivoting against the force of spring 126 to take a bypass position as shown in FIG. 10.

Each compact disk player assembly is connected by suitable flexible conduits 128 carrying wires for controlling the motors and CD players on the assemblies. The conduits also carry wires for the output from the CD players.

In operation of the jukebox, one must initially position CDs on the holders. In the preferred embodiment, this is done by opening doors 26,28 and placing a CD in a depression of CD holder 14a, which is in front of wall 30. A CD player assembly is then moved to the level of holder 14a, depending on the direction the holder is to be rotated, and motor 86 or its corresponding mirror mode is energized and causes holder 14a to be unlatched and contacted by gear 96 (or its corresponding mirror image gear). Motor 86 (or it mirror image motor) is then energized rotating holder 14a until the CD placed upon holder 14a is moved to a selection position between the plates of the CD player assembly. The CD is then loaded into the CD player by the lifter mechanism 108. The CD player assembly with the CD in the player is then lowered to a level corresponding to the holder 14 where it is desired to normally store the compact disc. That holder is then rotated in a manner described above until the desired storage depression in the holder is moved to its operative position between plates of the CD player assembly. The loader then unloads the CD from the player into the holder depression and the holder is rotated back to its storage position. The process continues until all the desired compact disks are placed. Once the CDs are placed for normal operation, the jukebox is closed.

When a patron desires to play the jukebox, the patron selects electronically on a suitable input device the songs the patron wishes to hear. The input device forwards electronically the level and storage position of the CD to the first of the CD player assemblies through a flexible coupling 128. The CD player assembly then moves vertically to the level of the holder where the compact disk is located. The holder is then rotated in a manner described above until holder moves to a selection position with storage position of the selected compact disk between the plates of the CD player assembly at which time it is loaded into the CD player. The CD player will then play the desired song. During the playing of the song, the CD player assembly will be moved to its normal rest position, either above the uppermost holder or below the lowermost holder, depending on its relationship with the other CD player assembly.

While the first tune is being played, if a second tune has been selected which is not on the CD currently being played, the second CD player assembly will move to and load the CD in the manner just described. However, it will not play that selection until playing of the first CD has finished. When playing the first compact disks ends, the second compact disk will immediately be played. The second CD player assembly, upon loading its CD, will be moved back to its rest position. The first CD player assembly, when it is finished playing the selection on the first CD, will be moved to the level of its original holder. The holder will be rotated so that the now empty depression from where the compact disk originally came will be placed in the operative position and the compact disk unloaded into the holder depression. The holder will then be rotated back to its storage position and the first CD player assembly will be free to load the next selection desired by the patron. The CD player assemblies will alternate to loading of CDs so each selection will begin immediately following the ending of the previous selection.

While the best mode for carrying out the invention has been described in detail, those familiar with the art to which this invention relates will recognize various alternative designs and embodiments for practicing the invention as defined by the following claims. In particular, rather than using the selector mechanism for musical compact disks in jukeboxes, the same mechanism can be used to provide a continuous flow of information to a computer system from data bearing compact disks. In such a case the only significant difference would be that the output from the CD players would be directed to the input of the computer rather than to the jukebox's speakers.

What is claimed is:

1. A selector mechanism for multiple compact disks comprising:

a housing;

a plurality of spaced, substantially parallel compact disk holders stacked vertically within said housing where each holder is capable of supporting a plurality of compact disks in individual storage positions and has a cut-out portion;

a compact disk player assembly movable vertically within the housing including a CD player and at extended portion shaped to pass through the cut-out portion of the holders;

means for selectively moving said assembly vertically between operating positions corresponding to each of the holders when the extended portion is aligned with the cut-out portion so the extended portion can pass therethrough;

means for moving the holder corresponding to the assembly when the assembly is in its operating position relative to said holder between a cache position and selection positions, the cache position of the holder being where said cut-out portion is aligned with the extended portion to allow movement by the vertical movement means and the selection positions being where the extended portion overlays a compact disk storage position of said holder so that the assembly can pick up a compact disk supported on the holder at that storage position and load the compact disk within the player;

a second compact disk player assembly within the housing including a second CD player and a portion shaped to pass through the cut-out portion of the holders and movable vertically between operative positions corresponding to each of the holders when the holder is in the cache position so that the extended portion is aligned with the cut-out portion and the extended portion can pass therethrough;

second means for selectively moving said second assembly vertically between operating positions or to a rest position which does not conflict with the operating positions of the first compact disk player assembly;

second means for moving the holder corresponding to the second assembly when the second assembly is in its operating position relative to said holder between the cache position and selection positions where the extended portion of the second CD player assembly overlies one of said compact disk storage positions of the holder so that the second assembly can pick up a storage disk supported on the holder at that storage position and load the compact disk within the second CD player; and wherein the means for vertically moving the first assembly alternatively can move the assembly to a second rest position not conflicting with the operating positions of the second assembly.

2. The mechanism of claim 1 wherein the CD player of an assembly is able to play a loaded compact disk while the assembly is moved by its vertical moving means.

3. The mechanism of claim 1 wherein the holders are substantially circular but for a substantially pie-shaped portion and are rotatable about a common axis by the means for relative movement and the extended portion of the assembly is substantially pie-shaped.

4. A selector mechanism for multiple compact disks comprising:

a housing;

a plurality of spaced, substantially parallel compact disk holders stacked vertically within said housing where each holder is capable of supporting a plurality of compact disks in individual storage positions and has a cut-out portion;

a compact disk player assembly movable vertically within the housing including a CD player and a extended portion shaped to pass through the cut-out portion of the holders;

means for selectively moving said assembly vertically between operating positions corresponding to each of the holders when the extended portion is aligned with the cut-out portion so the extended portion can pass therethrough;

means for moving the holder corresponding to the assembly when the assembly is in its operating position relative to said holder between a cache position and selection positions, the cache position of the holder being where said cut-out portion is aligned with the extended portion to allow movement by the vertical movement means and the selection positions being where the extended portion overlays a compact disk storage position of said holder so that the assembly can pick up a compact disk supported on the holder at that storage position and load the compact disk within the player; and wherein each holder has an associated latch that abuts an interior edge of the cut-out portion when the assembly is not in an operating position corresponding to the holder acting to restrain the holder in its cache position.

* * * * *